United States Patent [19]

Hauk

[11] Patent Number: 4,770,444

[45] Date of Patent: Sep. 13, 1988

[54] JOINT FOR OIL-OR GAS-FIELD PIPE

[75] Inventor: Viktor Hauk, Düsseldorf, Fed. Rep. of Germany

[73] Assignee: Mannesmann Aktiengesellschaft, Düsseldorf, Fed. Rep. of Germany

[21] Appl. No.: 5,686

[22] Filed: Jan. 21, 1987

[30] Foreign Application Priority Data

Jan. 23, 1986 [EP] European Pat. Off. ........ 86100862.1

[51] Int. Cl.$^4$ .............................................. F16L 9/14
[52] U.S. Cl. ...................................... 285/55; 285/94; 285/333; 285/916; 29/458
[58] Field of Search ................ 285/333, 334, 916, 55, 285/94; 29/458

[56] References Cited

U.S. PATENT DOCUMENTS

| | | | |
|---|---|---|---|
| 2,340,706 | 2/1944 | Somer | 285/916 |
| 2,641,488 | 6/1953 | Dunn et al. | 285/916 X |
| 3,468,563 | 9/1969 | Duret | 285/94 X |
| 4,153,283 | 5/1979 | Hellmund et al. | 285/334 |
| 4,527,815 | 7/1985 | Frick | 285/94 X |
| 4,550,937 | 11/1985 | Duret | 285/334 |
| 4,623,173 | 11/1986 | Honda et al. | 285/333 |

FOREIGN PATENT DOCUMENTS 1162734 9/1958 France .................. 285/333

Primary Examiner—Dave W. Arola
Attorney, Agent, or Firm—Herbert Dubno; Andrew Wilford

[57] ABSTRACT

A gas- and oil-field pipe joint comprises a female part formed with a frustoconical internal thread and a male part formed with a complementary frustoconical external thread and screwable into the female part with both parts centered on a common axis. The female part further is formed centered on the axis with a frustoconical inner surface axially inward from the internal screwthread and with a frustoconical shoulder surface extending radially inward from the axially inner end of the inner surface. The male part is formed centered on the axis with a barrel portion having an ellipsoidal barrel surface engageable radially with the inner surface and with a frustoconical end surface engageable axially with the shoulder surface of the female part. The barrel portion is formed with a central frustoconical surface portion substantially complementary to the inner surface, and the end surface and the shoulder surface extend spacedly parallel to each other when the parts are threaded together with the frustoconical surface portion in contact with the inner surface but without substantial deformation of either of the parts.

12 Claims, 1 Drawing Sheet

JOINT FOR OIL-OR GAS-FIELD PIPE

FIELD OF THE INVENTION

The present invention relates to oil- and gas-field pipe. More particularly this invention concerns a joint for such piping.

BACKGROUND OF THE INVENTION

Pipe in an oil or gas field or even in a gas or oil pipeline is typically joined by tapered screwthreads. In addition the joint is provided with extra formations intended to ensure a perfect seal without reliance on the screwthreads.

In German patent No. 1,533,619 (citing German patent document Nos. 1,152,673 and 1,243,605 and German utility model No. 1,906,009) filed Apr. 28, 1967 by H. Hillemanns et al the male part of the joint has a barrel-shaped outer end. The corresponding region of the female part is purely frustoconical so that the barrel portion engages it in line contact. In addition the outer end of the male part is frustoconical and the female part is formed with a complementary shoulder. The inclination of the frustoconical end and shoulder surface is such that they engage each other the outer end of the male part is cammed outward. This causes the barrel portion to roll off in annular line contact on the frustoconical region of the female part as the two parts are power tightened together, forming a tight annular seal line.

Similarly German patent document No. 2,483,387 (citing German patent document Nos. 628,915 and 2,134,274 as well as French patent No. 2,178,948 and U.S. Pat. No. 2,239,942) filed Aug. 7, 1974 by H. Kaluza describes such an arrangement wherein the cone angle of the frustoconical end of the male part is smaller than that of the shoulder so that as the two are forced together they move from line to surface contact. Otherwise as in the other above-described system, this arrangement has a wholly curved barrel region both at the outer end of the male part and on the outer end of the female part to provide two more annular seal lines.

Both systems suffer from two main drawbacks. First of all any damage to the barrel portion can lead to a serious loss of seal. Since the seal is made at the barrel portion by a region of line contact, a small pit at this region can lead to a leak. Since the barrel portion is provided on the outer surface of the outer end of the pipe, it is frequently damaged somewhat before installation, so that the pipe must be discarded or the risk of a leak tolerated.

In addition such arrangements concentrate so much force in the various regions of line contact that material failure and deformation at these regions is likely. The joint can thus become weakened and/or frozen due to the flowing of the steel of the pipes at the seal lines.

OBJECTS OF THE INVENTION

It is therefore an object of the present invention to provide an improved joint for gas- and oil-field pipe.

Another object is the provision of such a joint for gas- and oil-field pipe which overcomes the above-given disadvantages, that is which will provide a good seal even if slightly damaged and that will also seal without substantial plastic deformation of the materials of the pipe-joint parts.

A further object is a method of assembling such a joint.

SUMMARY OF THE INVENTION

These objects are obtained in a gas- and oil-field pipe joint comprising a female part formed with a frustoconical internal thread and a male part formed with a complementary frustoconical external thread and screwable into the female part with both parts centered on a common axis. The female part further is formed centered on the axis with a frustoconical inner surface axially inward from the internal screwthread and with a frustoconical shoulder surface extending radially inward from the axially inner end of the inner surface. The male part is formed centered or the axis with a barrel portion having an ellipsoidal barrel surface engageable radially with the inner surface and with a frustoconical end surface engageable axially with the shoulder surface of the female part. According to the invention the barrel portion is formed with a central frustoconical surface portion substantially complementary to the inner surface, that is having a cone angle at most 1° smaller than that of the inner surface, and the end surface and the shoulder surface extend spacedly parallel to each other when the parts are threaded together with the frustoconical surface portion in contact with the inner surface but without substantial deformation of either of the parts.

This system will ensure that surface contact is made in the joint rather than simple line contact. Since the sealing region extends axially over a substantially longer distance than in the prior-art systems, minor flaws in the surface of the pipe end will not result in leaks. To form a leak the frustoconical central portion of the surface of the barrel would have to be axially grooved from its outer to its inner axial end, something unlikely to occur even in relatively rough field conditions.

The screwthreads of the system of this invention can be of trapezoidal or triangular section. The roots of the threads can run parallel to the pipe axis or on a frustocone centered thereon. Threads having an angle of +/−15° to the pipe axis are particularly suitable. Generally the thread profile on the male part is wider and-/or the thread height is greater than the grooves of the threads of the female part.

According to another feature of this invention the male part is formed between the external screwthread and the barrel portion with a radially outwardly open groove centered on the axis and forming a region of reduced wall thickness in the male part. This ensures relatively good elastic deformation at this location for the male part. Furthermore the cone angles of the inner surface and frustoconical surface portion are such that when the parts are machine tightened with the end and shoulder surfaces abutting the yield points of the materials of the parts at the inner surface and frustoconical surface are not exceeded. The frustoconical surface portion and/or the inner surface is hardened by cold working, for instance grinding or rolling. It is also possible for the frustoconical surface portion and/or the inner surface to hard-chromed, that is provided with a surface layer of hard chromium. To further prevent plastic deformation and ease assembly means, as for instance a lubricant, is used to reduce friction between the inner surface and frustoconical surface portion.

According to another feature of this invention the frustoconical surface portion has an axial dimension which varies from the radial dimension of the end portion by a factor of from 0.5 to 1.5. Furthermore the frustoconical surface portion and the inner surface have a cone angle that is greater by about a factor of three greater than the cone angle of the screwthreads.

The pipe joint according to this invention is assembled by first fitting the male part axially into the female part with the respective threads engageable, then hand-tightening the two parts together by relatively rotating same while urging same axially together until the frustoconical surface portion and the inner surface abut in generally surface contact, and finally thereafter machine tightening the two parts together with deformation of the parts by relatively rotating same while urging same axially together until the end surface and shoulder surface engage each other axially. Machine tightening is typically carried out by power tools, but actually merely is further tightening once the two parts start to deform, something that requires much greater torque than "hand tightening." In addition a lubricant is provided on the screwthreads and/or on the end and shoulder surfaces before fitting the parts together.

DESCRIPTION OF THE DRAWING

The above and other features and advantages will become more readily apparent from the following, reference being made to the accompanying drawing in which.

SPECIFIC DESCRIPTION

Figures 1, 2:
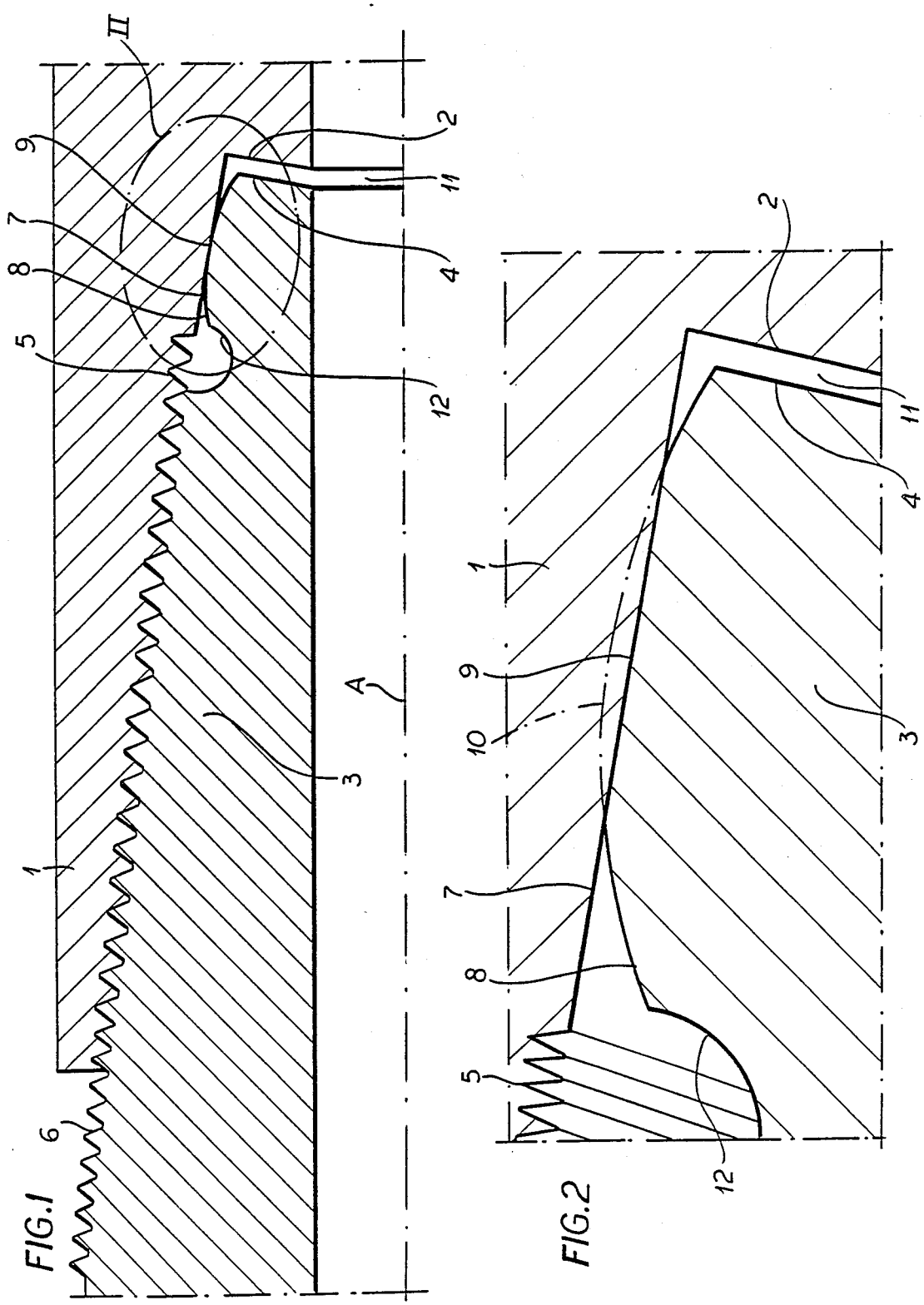
FIG. 1 is an axial section through the pipe joint according to this invention in partly tightened condition.
FIG. 2 is a large-scale view of the detail indicated at II in FIG. 1.

As seen in FIG. 1 a pipe joint according to the invention is centered on an axis A which is here illustrated for convenience's sake somewhat closer to the wall of the joint than is customary and includes a female end part 1 formed with an internal thread 5 and a male end part 3 formed with a complementary external thread 6. In addition the part 1 is formed at the inner end of its thread 5 with a frustoconical inwardly directed surface 7 centered on the axis A and with a frustoconical shoulder surface 2 also centered on the axis A and generally meeting the surface 7 at 90°. The outer end of the part 3 is formed with a barrel-shaped surface 8 centered on the axis A and extending from an end surface 4 complementary to the surface 2 to a radially outwardly open semicircular-section groove 12 itself bounding the outer limit of the screwthread 6.

Such a joint can be formed between two pieces of pipe, between two couplings, or between any two elements that must be threaded together to form a strong and gas-tight connection. The assembly of such a joint always takes place in two stages. In the first so-called hand-tight stage the parts 1 and 3 are fitted together and relatively rotated until they stick. To ease most of these operations the surfaces 2, 4, 7, and 9 are greased beforehand. Then power tools are usually employed to continue to screw the parts 1 and 3 together until a certain torque, which is established by the pipe manufacturer, has been reached.

According to this invention the barrel surface 8, which is formed in the prior art as illustrated at dot-dash line 10 in FIG. 2 wholly as a three-dimension annular surface bounded by two spaced planes both perpendicular to the axis A and of ellipsoidal shape centered on the axis A, is formed with a central frustoconical portion 9 which is of a conicity angle varying by between 0° and −1° from that of the portion 7. These substantially complementary surfaces 7 and 9 abut in substantial surface contact before the surfaces 2 and 4 meet, that is while same are still at a spacing 11. Thus when hand-tight the surfaces 9 and 7 abut but the surfaces 2 and 4 are spaced.

Machine tightening of the joint forces the surfaces 7 and 9 into tighter contact and eventually presses the surfaces 2 and 4 together. Since the contact between the surfaces 7 and 9 is over a surface, and not at a line as in the prior-art systems with the shape shown at 10, minor damage to this surface 9 will not cause a leak.

Further according to the invention the surfaces 7 and 9 have a conicity angle of about 15°. When machine tightened the elastic limits of the materials of the parts 1 and 3 are not exceeded. The elastic limit in the region of the surface 9 can be increased by cold working. Here the surface 7 is cold worked by rolling and the surface 9 is hard-chromed. In addition the friction between the surfaces 7 and 9 can be decreased by surface treatment, e.g. polishing. The surface 9 has an axial dimension which varies from the radial dimension of the shoulder surface by a factor of between 0.5 and 1.5. In addition the surfaces 7 and 9 have a cone angle which is greater by a factor of three than the cone angle of the screwthreads 5 and 6.

I claim:

1. In a gas- and oil-field pipe joint comprising a female part formed with a frustoconical internal thread and a male part formed with a complementary frustoconical external thread and screwable into the female part with both parts centered on a common axis, the female part further being formed centered on the axis with a frustoconical inner surface axially inward from the internal screwthread and with a frustoconical shoulder surface extending radially inward from the axially inner end of the inner surface, the male part being formed centered on the axis with a barrel portion having an ellipsoidal barrel surface engageable radially with the inner surface and with a frustoconical end surface engageable axially with the shoulder surface of the female part, the improvement wherein:

the barrel portion is formed before the male part is screwed into the female part with a central frustoconical surface portion substantially complementary to the inner surface, whereby screwing of the two parts together takes place without substantial plastic or elastic deformation of the barrel portion, the frustoconical surface portion having an axial dimension which is equal to between 0.5 and 1.5 times the radial dimension of said frustoconical shoulder surface of said female part; and the end surface and the shoulder surface extend spacedly parallel to each other when the parts are hand tightened together with the frustoconical surface portion in substantial surface contact with the inner surface but without substantial deformation of either of the parts and the end and shoulder surfaces engage each other when the parts are machine tightened together.

2. The improved gas- and oil-field pipe joint defined in claim 1 wherein the male part is formed between the external screwthread and the barrel portion with a radially outwardly open groove centered on the axis and forming a region of reduced wall thickness in the male part.

3. The improved gas- and oil-field pipe joint defined in claim 1 wherein the cone angles of the inner surface and frustoconical surface portion are such that when the parts are machine tightened with the end and shoulder surfaces abutting the yield points of the materials of the parts at the inner surface and frustoconical surface are not exceeded.

4. The improved gas- and oil-field pipe joint defined in claim 1 wherein the frustoconical surface portion is hardened.

5. The improved gas- and oil-field pipe joint defined in claim 1 wherein the inner surface is hardened.

6. The improved gas- and oil-field pipe joint defined in claim 1 wherein the frustoconical surface portion is hard-chromed.

7. The improved gas- and oil-field pipe joint defined in claim 1 wherein the inner surface is hard-chromed.

8. The improved gas- and oil-field pipe joint defined in claim 1, further comprising
   means for reducing friction between the inner surface and frustoconical surface portion.

9. The improved gas- and oil-field pipe joint defined in claim 1 wherein the frustoconical surface portion and the inner surface have a cone angle that is greater by about a factor of three greater than the cone angle of the screwthreads.

10. A method of using the improved gas- and oil-field pipe joint defined in claim 1 comprising the steps of sequentially:
    fitting the male part axially into the female part with the respective threads engageable;
    hand-tightening the two parts together by relatively rotating same while urging same axially together until the frustoconical surface portion and the inner surface abut in generally surface contact; and
    thereafter machine tightening the two parts together with deformation of the parts by relatively rotating same while urging same axially together until the end surface and shoulder surface engage each other axially.

11. The improved gas- and oil-field pipe joint defined in claim 10, further comprising the step of
    providing a lubricant on the screwthreads before fitting the parts together.

12. The improved gas- and oil-field pipe joint defined in claim 10, further comprising the step of
    providing a lubricant on the end and shoulder surfaces before fitting the parts together.

* * * * *